(12) United States Patent
Ishikawa et al.

(10) Patent No.: US 9,969,146 B2
(45) Date of Patent: May 15, 2018

(54) LAYERED SUBSTRATE AND METHOD FOR MANUFACTURING SAME

(71) Applicant: MITSUBISHI RAYON CO., LTD., Chiyoda-ku (JP)

(72) Inventors: Takeshi Ishikawa, Toyohashi (JP); Masao Tomioka, Toyohashi (JP); Masahiro Osuka, Toyohashi (JP); Yuuji Fujita, Toyohashi (JP); Yukichi Konami, Toyohashi (JP); Takahiro Hayashi, Toyohashi (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 180 days.

(21) Appl. No.: 14/774,036

(22) PCT Filed: Mar. 10, 2014

(86) PCT No.: PCT/JP2014/056142
§ 371 (c)(1),
(2) Date: Sep. 9, 2015

(87) PCT Pub. No.: WO2014/142061
PCT Pub. Date: Sep. 18, 2014

(65) Prior Publication Data
US 2016/0016382 A1    Jan. 21, 2016

(30) Foreign Application Priority Data

Mar. 11, 2013  (JP) ................................. 2013-048018
Mar. 11, 2013  (JP) ................................. 2013-048019

(51) Int. Cl.
*B32B 5/26* (2006.01)
*B32B 27/08* (2006.01)
(Continued)

(52) U.S. Cl.
CPC ................ *B32B 5/26* (2013.01); *B32B 3/266* (2013.01); *B32B 27/08* (2013.01);
(Continued)

(58) Field of Classification Search
CPC ...................................................... B32B 5/26
(Continued)

(56) References Cited

U.S. PATENT DOCUMENTS

2010/0028593 A1  2/2010  Taketa et al.
2013/0095282 A1  4/2013  Taketa et al.
2016/0009054 A1  1/2016  Okunaka

FOREIGN PATENT DOCUMENTS

EP    2 127 840 A1   12/2009
EP    2 966 117 A1    1/2016
(Continued)

OTHER PUBLICATIONS

Extended European Search Report dated Jun. 30, 2016 in Patent Application No. 14763681.5.
(Continued)

*Primary Examiner* — Brent T O'Hern
(74) *Attorney, Agent, or Firm* — Oblon, McClelland, Maier & Neustadt, L.L.P.

(57) ABSTRACT

Provided are a layered substrate that has excellent mechanical properties such as a flexural strength or a flexural modulus applicable to a structural material, the variations in those mechanical properties are small, exhibits excellent formability into a complicated shape, and is able to be molded in a short time, and a method for manufacturing the same. A layered substrate fabricated by layering plural sheets of sheet-shaped prepregs containing a reinforcing fiber oriented in one direction and a thermoplastic matrix resin, wherein the prepreg has a slit penetrating from the
(Continued)

front surface to the back surface, each slit is provided so as to intersect with each reinforcing fiber only one time.

15 Claims, 1 Drawing Sheet

(51) Int. Cl.
    *B32B 3/26* (2006.01)
    *B32B 37/12* (2006.01)
    *C08J 5/24* (2006.01)
    *C08K 7/06* (2006.01)
    *B32B 5/12* (2006.01)

(52) U.S. Cl.
    CPC .............. *B32B 37/1207* (2013.01); *C08J 5/24* (2013.01); *C08K 7/06* (2013.01); *B32B 5/12* (2013.01); *B32B 2260/023* (2013.01); *B32B 2260/046* (2013.01); *B32B 2262/00* (2013.01); *B32B 2262/106* (2013.01); *B32B 2307/544* (2013.01); *B32B 2307/546* (2013.01); *B32B 2307/738* (2013.01); *B32B 2605/00* (2013.01); *C08J 2323/26* (2013.01)

(58) Field of Classification Search
    USPC ........................................................ 428/114
    See application file for complete search history.

(56) References Cited

FOREIGN PATENT DOCUMENTS

| JP | 63-247012 | | 10/1988 |
|---|---|---|---|
| JP | 63-267523 | | 11/1988 |
| JP | 02-115236 | | 4/1990 |
| JP | 02115236 A | * | 4/1990 |
| JP | 07-164439 | | 6/1995 |
| JP | 2003-211447 | | 7/2003 |
| JP | 2005-281464 | | 10/2005 |
| JP | 2008-207544 | | 9/2008 |
| JP | 2008-207545 | | 9/2008 |
| JP | 2009-286817 | | 12/2009 |
| JP | 2010-023449 | | 2/2010 |
| JP | 2010023449 A | * | 2/2010 |

OTHER PUBLICATIONS

I. Taketa, et al., "Enhancement of strength and uniformity in unidirectionally arrayed chopped strands with angled slits" Composites: Part A, vol. 41, No. 11, XP027306140, 2010, pp. 1639-1646.
"TORAYCA® T700S Data Sheet" Technical Data Sheet No. CFA-005, XP055283060, Jan. 11, 2006, p. B332.
Office Action dated Aug. 3, 2016 in Japanese Patent Application No. 2015-700027 (with English language translation).
International Search Report dated Jun. 10, 2014 in Corresponding PCT/JP2014/056142.
Maël Garnier, "In-line compounding and molding of long-fiber reinforced thermoplastics (D-LFT): Insight into a rapid growing technology", ANTEC 2004, Conference Proceedings 4 pages.
Toray CA Typical Fibre Properties, Toray Carbon Fibers Europe, (Nov. 27, 2012)

* cited by examiner

LAYERED SUBSTRATE AND METHOD FOR MANUFACTURING SAME

TECHNICAL FIELD

The present invention relates to a layered substrate that exhibits excellent formability into a complicated shape at the time of stamping molding, is able to be molded in a short time, and is molded into a part which has excellent mechanical properties applicable to a structural material and low variability in those mechanical properties, and a method for manufacturing the same. More specifically, the invention relates to a layered substrate that easily follows molding of a three-dimensional shape such as a rib and a boss, maintains the mechanical strength as a structural member, and is an intermediate substrate of a fiber reinforced plastic which is suitably usable, for example, in an aircraft member, an automobile member, and sports goods, and a method for manufacturing the same.

This application is based upon and claims the benefit of priority of the prior Japanese Patent Application No. 2013-048018 filed in the Japanese Patent Office on Mar. 11, 2013 and the prior Japanese Patent Application No. 2013-048019 filed in the Japanese Patent Office on Mar. 11, 2013, the entire contents of which are incorporated herein by reference.

BACKGROUND ART

As the molding method of a fiber reinforced thermoplastic plastic, stamping molding is most generally performed in which a substrate (prepreg) of a continuous reinforcing fiber impregnated with a thermoplastic resin is layered and heated and pressed using a press or the like to form into an intended shape. The fiber reinforced plastic thus obtained has excellent mechanical properties since a continuous reinforcing fiber is used. In addition, it is possible to design the required mechanical properties and variations in mechanical properties are also small as continuous reinforcing fibers are regularly arranged. However, it is difficult to form into a complicated shape such as a three-dimensional shape since it is a continuous reinforcing fiber, and thus the use of the fiber reinforced plastic manufactured in this manner is mainly limited to a member having a shape close to a flat shape.

In order to solve this problem, a method to obtain a sheet exhibiting excellent stamping moldability and favorable fluidity by dispersing chip-shaped prepregs obtained by cutting a tape-shaped prepreg having a narrow width into a certain length on a plane (Patent Document 1). However, it is significantly difficult to dispose chip-shaped prepregs having a certain width and a certain length on a flat plate in completely random directions, and thus the sheet manufactured in this manner has a problem that the mechanical properties thereof are different depending on the position or the orientation even in the same sheet.

In addition, D-LFT molding in which the reinforcing fiber is directly fed to the screw portion of a molding machine, cutting and dispersion of the fiber are conducted at the same time, and injection molding or extrusion molding is then continuously conducted is also performed in recent years for the purpose of improving production efficiency (Non-Patent Document 1). According to this method, the reinforcing fiber easily flows and is also able to follow a complicated shape such as a three-dimensional shape since it is cut into a proper length. However, the D-LFT has a problem that the mechanical properties thereof decrease or variations in values of the mechanical properties increase since unevenness in fiber length or fiber distribution occurs in the cutting and dispersing process.

A layered substrate is disclosed that is obtained by carving a slit into a prepreg composed of a continuous fiber and a thermoplastic resin in order to remedy the drawbacks of the materials as described above and thus able to be molded in a short time, exhibits excellent formability at the time of molding, and exerts excellent mechanical properties when being formed into a fiber reinforced plastic (Patent Documents 2 and 3). However, it cannot be said that a strength enough to be applied as a structural material is obtained from this layered substrate although it exhibits higher mechanical properties as compared with the D-LFT and the variations therein are small.

In addition, a method to improve the problem on the strength and the variation therein described above by optimizing the slit shape is disclosed (Patent Documents 4 to 6). However, according to this method, the mechanical properties and the variations therein are improved but uniform fluidity of the layered substrate to be formed into a complicated three-dimensional shape such as a thin rib or boss is insufficient. In addition, according to this method, it is required to dispose a large number of steep slits in the fiber direction and it takes a significantly long time to carve the slit in the case of cutting using a cutting plotter. In addition, according to this method, in the case of disposing the slit by punching, there is a problem that not only the manufacturing cost of the punching blade is enormous but also a crack is likely to generate in the fiber direction at the time of punching and missing of sheet between the adjacent slits occurs.

CITATION LIST

Patent Document

Patent Document 1: JP 07-164439 A
Patent Document 2: JP 63-247012 A
Patent Document 3: JP 63-267523 A
Patent Document 4: JP 2008-207544 A
Patent Document 5: JP 2008-207545 A
Patent Document 6: JP 2009-286817 A

Non-Patent Document

Non-Patent Document 1: In-line compounding and molding of long-fiber reinforced thermoplastics (D-LFT): Insight into a rapid growing technology. ANTEC2004 Conference Proceedings p. 3500

SUMMARY OF THE INVENTION

Problem to be Solved by the Invention

The invention is intended to solve the problems of the prior art described above, and an object thereof is to provide a layered substrate that has excellent mechanical properties such as a flexural strength or a flexural modulus applicable to a structural material, the variations in those mechanical properties are small, exhibits excellent formability into a complicated shape, and is able to be molded in a short time, and a method for manufacturing the same.

Means for Solving Problem

The present inventors have carried out extensive investigations in order to solve the above problem, and as a result, have found out that the above problem can be solved by providing a prepreg containing a reinforcing fiber oriented in one direction and a thermoplastic matrix resin with a specific slit, whereby the invention has completed. In other words, the invention has embodiments as the following (1) to (15).

(1) A layered substrate fabricated by layering plural sheets of sheet-shaped prepregs containing a reinforcing fiber oriented in one direction and a thermoplastic matrix resin, in which the prepreg has a slit penetrating from the front surface to the back surface, each slit is provided so as to intersect with each reinforcing fiber only one time, in a case in which a length of a line connecting a starting point with an end point of the slit is denoted as Ls, the length Ls of the line and a length Lr of the slit satisfy the relation of the following Equation 1, $$Ls \leq Lr \leq Ls \times 1.5 \qquad \text{(Equation 1)}$$

the line and a fiber direction of the reinforcing fiber intersect at an angle of 30° or more and 90° or less, and a sum of the length Lr of the slits per 1 m² of the prepreg is 20 m or longer and 200 m or shorter.

(2) The layered substrate including a prepreg according to (1), in which a length of the reinforcing fiber cut by the slit is 5 mm or longer and 100 mm or shorter.

(3) The layered substrate according to (1) or (2), in which the reinforcing fiber is a carbon fiber having an average single fiber fineness of 0.5 dtex or more and 2.4 dtex or less.

(4) The layered substrate according to any one of (1) to (3), in which the layered substrate further includes a layer composed of a thermoplastic resin.

(5) The layered substrate according to any one of (1) to (4), in which the plurality of prepregs constituting the layered substrate are layered such that directions of the reinforcing fibers contained in the prepregs are quasi-isotropic.

(6) The layered substrate according to any one of (1) to (4), in which the plurality of prepregs constituting the layered substrate are constituted by alternately layering the prepregs having a direction of the reinforcing fibers contained in the respective prepregs of 0° and the prepregs having a direction of the reinforcing fibers contained in the respective prepregs of 90° when a direction of the reinforcing fiber contained in an arbitrary one among the prepregs is denoted as 0°.

(7) The layered substrate according to any one of (1) to (6), in which a line connecting a starting point with an end point of a slit and a reinforcing fiber intersect at an angle of 30° or more and 60° or less.

(8) The layered substrate according to any one of (1) to (7), in which a volume content of the reinforcing fiber contained in the prepreg constituting the layered substrate is 20% by volume or more and 55% by volume or less with respect to the total volume of the prepreg.

(9) The layered substrate according to any one of (1) to (8), in which in any 5 cm×5 cm part of the prepreg, a sum of the length Lr of the slits per 25 cm² is 0.5 m or longer and 5 m or shorter.

(10) The layered substrate according to any one of (1) to (9), in which a thickness of the prepreg constituting the layered substrate is 50 μm or more and 200 μm or less.

(11) The layered substrate according to any one of (1) to (10), in which the prepregs constituting the layered substrate are bonded to one another.

(12) The layered substrate according to any one of (1) to (11), in which 50% or more of the entire outer peripheral cross section of the layered substrate is covered with a sheet-shaped material which retains its shape at a temperature of a melting point +10° C. of a matrix resin constituting the prepreg.

(13) The layered substrate according to (12), in which the sheet-shaped material is a pressure sensitive adhesive tape, and the pressure sensitive adhesive tape is pasted along an outer periphery of the layered substrate so as to cover an outer peripheral portion of a lowermost layer substrate, an outer peripheral cross section of the layered substrate, and an outer peripheral portion of an uppermost layer substrate.

(14) A method for manufacturing a layered substrate by layering plural sheets of prepregs, in which plural sheets of the prepregs are layered and 50% or more of the entire outer peripheral cross section of the layered substrate is then covered with a sheet-shaped material which retains its shape at a temperature of a melting point +10° C. of a matrix resin constituting the prepreg.

(15) The method for manufacturing a layered substrate according to (14), in which the sheet-shaped material is a pressure sensitive adhesive tape, and the pressure sensitive adhesive tape is pasted along an outer periphery of the layered substrate so as to cover an outer peripheral portion of a lowermost layer substrate, an outer peripheral cross section of the layered substrate, and an outer peripheral portion of an uppermost layer substrate.

In addition, the following (16) to (27) are also embodiments of the invention.

(16) The layered substrate according to any one of (1) to (13), in which the slit is carved using a laser marker.

(17) The layered substrate according to any one of (1) to (13), in which the slit is carved using a cutting plotter.

(18) The layered substrate according to any one of (1) to (13), in which the slit is carved using a punching die.

(19) The layered substrate according to any one of (1) to (13) and (16) to (18), in which a length of at least one side of the prepreg is 1 m or longer and an area of the prepreg is 1 m² or more.

(20) The method for manufacturing a layered substrate according to (14) or (15), in which the prepreg has a slit penetrating from the front surface to the back surface, each slit is provided so as to intersect with each reinforcing fiber only one time, in a case in which a length of a line connecting a starting point with an end point of the slit is denoted as Ls, a length Lr of the slit satisfy the relation of the following Equation 1, $$Ls \leq Lr \leq Ls \times 1.5 \qquad \text{(Equation 1)}$$

the line and a fiber direction of the reinforcing fiber intersect at an angle of 30° or more and 90° or less, and a sum of the length Lr of the slits per 1 m² of the prepreg is 20 m or longer and 200 m or shorter.

(21) The method for manufacturing a layered substrate according to (20), in which the slit is carved using a laser marker.

(22) The method for manufacturing a layered substrate according to (20), in which the slit is carved using a cutting plotter.

(23) The method for manufacturing a layered substrate according to (20), in which the slit is carved using a punching die.

(24) The method for manufacturing a layered substrate according to any one of (14), (15) and (20) to (23), in which the prepregs layered are bonded to one another by heat welding before or after 50% or more of the entire outer peripheral cross section of the layered substrate is covered with a sheet-shaped material which retains its shape at a temperature of a melting point +10° C. of a matrix resin constituting the prepreg.

(25) The method for manufacturing a layered substrate according to any one of (14), (15) and (20) to (23), in which the prepregs layered are bonded to one another by vibration welding before or after 50% or more of the entire outer peripheral cross section of the layered substrate is covered with a sheet-shaped material which retains its shape at a temperature of a melting point +10° C. of a matrix resin constituting the prepreg.

(26) The method for manufacturing a layered substrate according to any one of (14), (15) and (20) to (23), in which the prepregs layered are bonded to one another by hot pressing before or after 50% or more of the entire outer peripheral cross section of the layered substrate is covered with a sheet-shaped material which retains its shape at a temperature of a melting point +10° C. of a matrix resin constituting the prepreg.

(27) The method for manufacturing a layered substrate according to any one of (14), (15) and (20) to (23), in which the prepregs layered are bonded to one another by hot roll pressing before or after 50% or more of the entire outer peripheral cross section of the layered substrate is covered with a sheet-shaped material which retains its shape at a temperature of a melting point +10° C. of a matrix resin constituting the prepreg.

In addition, the following modes are also included in another aspect of embodiments of the invention.

(1A) A layered substrate fabricated by layering plural sheets of prepregs containing a reinforcing fiber oriented in one direction and a thermoplastic resin, in which the prepreg has a slit having a depth enough to cut the reinforcing fiber in a direction crossing the reinforcing fiber, the slit is a straight line, the slit and the reinforcing fiber form an angle of 30° or more and 60° or less, and a sum of the slit length per 1 m² of the prepreg is 20 m or longer and 150 m or shorter.

(2A) A layered substrate fabricated by layering plural sheets of prepregs containing a reinforcing fiber oriented in one direction and a thermoplastic resin, in which the prepreg has a slit having a depth enough to cut the reinforcing fiber in a direction crossing the reinforcing fiber, the slit is a curve along a straight center line, the curve does not overlap the center line when being projected onto the center line, the center line and the reinforcing fiber form an angle of 30° or more and 60° or less, and a sum of the slit length per 1 m² of the prepreg is 20 m or longer and 150 m or shorter.

(3A) The layered substrate according to (1A) or (2A), in which a length of the reinforcing fiber cut by a slit is 10 mm or longer and 50 mm or shorter.

(4A) The layered substrate according to any one of (1A) to (3A), in which a thickness of the prepreg constituting the layered substrate is 50 μm or more and 200 μm or less.

In addition, the following modes are also included in another aspect of embodiments of the invention.

(1B) A layered substrate fabricated by layering plural sheets of prepregs containing a reinforcing fiber oriented in one direction and a thermoplastic resin, in which the prepreg has a slit having a depth enough to cut the reinforcing fiber in a direction crossing the reinforcing fiber, the slit is a straight line, the slit and the reinforcing fiber form an angle of 30° or more and 60° or less, a sum of the slit length per 1 m² of the prepreg is 20 m or longer and 150 m or shorter, a length of at least one side of the prepreg is 1 m or longer, and an area of the prepreg is 1 m² or more.

(2B) The layered substrate according to (1B), in which a length of the reinforcing fiber cut by a slit is 10 mm or longer and 50 mm or shorter.

(3B) The layered substrate according to (1B) or (2B), in which the plurality of prepregs constituting the layered substrate are constituted by alternately layering a prepreg (A), a prepreg (D), a prepreg (B), and a prepreg (F) which have a direction of the reinforcing fibers contained in the prepregs of 0°, 45°, 90°, and −45°, respectively.

(4B) The layered substrate according to any one of (1B) to (3B), in which the plurality of prepregs constituting the layered substrate are constituted by alternately layering a prepreg (d, e), a prepreg (b, c), and a prepreg (f, g) which are formed by combining two or more prepregs among a prepreg (A), a prepreg (D), a prepreg (B), and a prepreg (F) having a direction of the reinforcing fibers contained in the prepregs of 0°, 45°, 90°, and −45°, respectively, and have a direction of the reinforcing fibers contained in the prepregs of 45°, 90°, and −45°, respectively.

Effect of the Invention

According to the invention, it is possible to obtain a layered substrate that exhibits excellent formability into a complicated shape, is able to be molded in a short time, has excellent mechanical properties such as a flexural strength or a flexural modulus applicable to a structural material, and exhibits low variability in those mechanical properties, and a method for manufacturing the same.

MODE(S) FOR CARRYING OUT THE INVENTION

Figure 1:
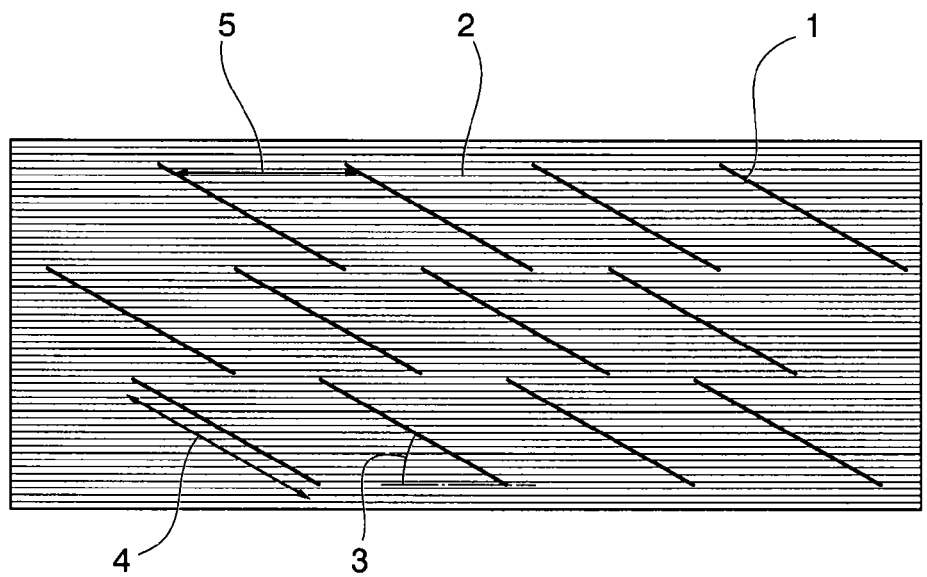
FIG. 1 is a side sectional view schematically illustrating a prepreg having a straight slit according to an embodiment of the invention.

The layered substrate according to an embodiment of the invention is a layered substrate fabricated by layering plural sheets of sheet-shaped prepregs containing a reinforcing fiber oriented in one direction and a thermoplastic matrix resin layered, and in the layered substrate, the prepreg has a slit penetrating from the front surface to the back surface, each slit is provided so as to intersect with each reinforcing fiber only one time, in a case in which a length of a line connecting a starting point with an end point of the slit is denoted as Ls, a length Lr of the slit satisfy the relation of the following Equation 1, $$Ls \leq Lr \leq Ls \times 1.5 \quad \text{(Equation 1)}$$

the line and a fiber direction of the reinforcing fiber intersect at an angle of 30° or more and 90° or less, and a sum of the length Lr of the slits per 1 m² of the prepreg is 20 m or longer and 200 m or shorter.

(Prepreg)

The prepreg used in the present embodiment is a sheet-shaped prepreg which contains a reinforcing fiber oriented in one direction and a thermoplastic matrix resin and has a slit penetrating from the front surface to the back surface in the direction intersecting with the reinforcing fiber. The reinforcing fiber oriented in one direction and the thermoplastic matrix resin will be described later. The expression "having a slit in a direction intersecting with the reinforcing fiber" is that the direction of the linear slit to be described later is not parallel to the reinforcing fiber and that the reinforcing fiber contained in the prepreg is cut at the site intersecting with the slit.

In general, there is a tendency that the mechanical properties of the layered substrate are excellent but the fluidity thereof at the time of stamping molding decreases as the length of the reinforcing fiber contained therein is longer. On the other hand, it is effective that the reinforcing fiber is short, namely, the reinforcing fiber is cut into a certain length in order to improve fluidity of the layered substrate at the time of stamping molding, and this makes it possible to obtain a layered substrate that is fluid enough to be formed into a complicated three-dimensional shape such as a rib or a boss. However, it is difficult to design a component in the case of the flat plate-shaped layered substrate in which the respective prepregs are layered so as to orient in arbitrary directions since the mechanical properties thereof are vary. As the strategy to solve this, plural sheets of prepregs having a slit are layered, and this makes it possible to obtain a layered substrate which has favorable mechanical properties, moreover, the variations therein are small, and exhibits excellent fluidity at the time of stamping molding.

The slit penetrates from the front surface to the back surface of the prepreg. Here, the expression "from the front surface to the back surface of the prepreg" means a pair of surfaces having the largest area are adopted as the front surface and the back surface for each of plural sheets of the prepregs constituting the layered substrate. The slit cuts a number of reinforcing fibers in the prepreg, and thus it is possible to make the fluidity of the layered substrate at the time of molding excellent.

The fluidity at the time of stamping molding depends on the angle (also simply referred to as the angle formed by the slit and the reinforcing fiber, hereinafter referred to as "$\theta$") at which the line (straight line) connecting the starting point with the end point of the slit and the fiber direction of the reinforcing fiber intersect and the sum (hereinafter referred to as "la") of the slit lengths Lr per 1 m$^2$ of the prepreg. Here, the starting point and end point of the slit refers to one end and the other end of a line, respectively, in a case in which the slit is linear as to be described later although slits which will be described later and have various shapes are taken in the direction in which the slits have the longest length and one end thereof is adopted as the starting point and the other end thereof is adopted as the end point. In addition, here, $\theta$ refers to the acute angle among the angles formed when the lines intersect.

As the value of $\theta$ is closer to 90 degrees, the shear force between the reinforcing fibers decreases and thus the fluidity increases, and the fluidity increases as the value of la is larger. In the case of a prepreg used in stamping molding of a flat plate, $\theta$ is preferably 25° or more and la is preferably 10 m or longer. Furthermore, in the case of stamping molding a complicated shape such as a rib, $\theta$ is preferably 30° or more and la is preferably 20 m or longer.

In addition, in any 5 cm×5 cm part of the prepreg, it is preferable that the sum (la) of the slit length Lr per 25 cm$^2$ is 0.5 m or longer and 5 m or shorter.

The mechanical properties represented by the flexural strength and the flexural modulus of the prepreg depend on not only the angle $\theta$ at which the line connecting the starting point with the end point of the slit intersecting with (to cut) the reinforcing fiber but also the sum la of the slit length per 1 m$^2$. It has been known that the mechanical properties are higher as $\theta$ is smaller (Patent Document 5), and higher mechanical properties are obtained as la is smaller. For example, in order to utilize the layered substrate of the present embodiment in the sub-structural member of an automobile, it is preferable that $\theta$ of the prepreg is 70° or less and la is 200 m or shorter. In addition, in order to use the layered substrate in a structural member having excellently balanced flexural strength and tensile strength, it is preferable that $\theta$ is 60° or less and la is 200 m or shorter.

The time or cost required for manufacturing a prepreg having a slit significantly depends on not only the angle $\theta$ at which the slit intersecting with the reinforcing fiber and the reinforcing fiber intersect but also the sum la of the slit length per 1 m$^2$. It takes a significantly long time to conduct the slit processing in a case in which $\theta$ is small and la is large, and a cutting plotter is used for cutting. In addition, in the case of processing the slit by punching, not only the manufacturing cost of the punching blade is enormous but also a crack is likely to generate in the fiber direction at the time of punching and missing of sheet between the adjacent slits occurs. Hence, $\theta$ is preferably 15° or more and la is preferably 200 m or shorter. Moreover, in consideration of the layering step after slit processing, $\theta$ is preferably 30° or more and la is more preferably 200 m or shorter.

As described heretofore, $\theta$ may be 30° or more and 90° or less and la may be 20 m or longer and 200 m or shorter in consideration of the application, mechanical properties required, processability and the like of the layered substrate.

In the prepreg that can be used in the layered substrate of the present embodiment, it is required that the reinforcing fiber contained in the prepreg is cut by a slit. The length (hereinafter, referred to as "L") of the cut reinforcing fiber cut is not particularly limited, but it is preferably 5 mm or longer and 100 mm or shorter from the viewpoint of mechanical properties and fluidity. The length is even more preferably 5 mm or longer and 50 mm or shorter and particularly preferably 10 mm or longer and 50 mm or shorter particularly in order to achieve both sufficient mechanical properties and the flow to the thin portion of a rib or the like at the time stamping molding.

Incidentally, it is preferable that the shape of the slit is a line, particularly a straight line or a curve. Here, to be a straight line (shaped) or a curve (shaped), namely, to be a line is that, for example, the width of the slit on the prepreg surface is less than 1.0 mm with respect to the length of the slit. The cross-sectional shape of this linear slit on the cross section of the front surface through the back surface may be any shape such as a rectangular shape or a wedge shape as long as the width of the slit on the surface is within this condition.

Figure 2:
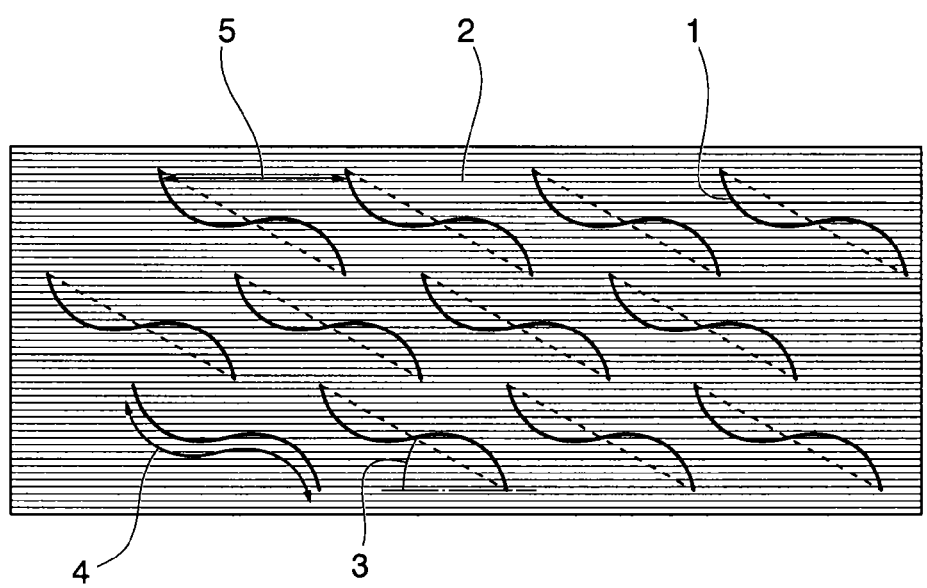
FIG. 2 is a side sectional view schematically illustrating a prepreg having a curved slit along a straight center line according to an embodiment of the invention.

In a case in which each slit is provided so as to intersect with each carbon fiber only one time and the length of the line connecting the starting point with the end point of the slit is denoted as Ls, the shape of the slit is not required to be a straight line as long as the slit length Lr satisfies the following Equation 1, but it is also possible to use a curve, for example, as illustrated in FIG. 2. Incidentally, the slit is a straight line in the case of Ls=Lv. Here, in a case in which the line along the center of the slit is a curve, the length of the slit refers to the full length of the curve (the sum of the journey that follows the line along the center).

$$Ls \leq Lr \leq Ls \times 1.5 \qquad \text{(Equation 1)}$$

It is possible to increase la while keeping the values of $\theta$ and L by setting the shape of slit to a curve. It is preferable since an improvement in stamping moldability can be expected while maintaining high mechanical properties in this case. However, it is preferable that the slit is a straight line as described above since it takes a significantly long time to conduct the slit processing.

The expression "each slit is provided so as to intersect with each carbon fiber only one time" means the state that the same one slit is provided so as to intersect with each carbon fiber only one time (one slit does not intersect with one carbon fiber plural times). On the other hand, it may be a state in which one slit intersects with a plurality of carbon fibers. Specifically, it is possible to favorably realize these states when the slit is a straight line or a curve less curved.

As the prepreg that can be used in the layered substrate of the present embodiment, prepregs having different slit length and different number of slits may be layered as long as the values of θ and la are within predetermined ranges. It is preferable to increase θ and la of the part having a thin three-dimensional shape such as a boss or a rib at the time of stamping molding. On the other hand, it is preferable to decrease θ and la of the part where the flow is two-dimensional, the flow length is short, and high mechanical properties are required.

In the prepreg that can be used in the layered substrate of the present embodiment, when the fiber volume content Vf is 55% or less, sufficient fluidity can be obtained and thus preferable. The fluidity is improved as the value of Vf is smaller, but the mechanical properties required for a structural material cannot be obtained when the value of Vf is less than 20%. In view of the relation between fluidity and mechanical properties, the value of Vf is preferably 20% or more and 55% or less. The Vf value can be determined, for example, from the density ρc of the prepreg obtained by collecting a gas over water, the density of the fiber ρf obtained by the same method, the mass W of the prepreg, and the weight W1 of the prepreg after being burned to destroy the resin using the following Equations.

$$Wf=(W-W1)\times 100/W \qquad \text{Equation (2)}$$

$$Vf=Wf\times \rho c/\rho f \qquad \text{Equation (3)}$$

With regard to the thickness of the prepreg, the prepreg that can be used in the layered substrate of the present embodiment has a slit, and thus the strength of the prepreg tends to decrease as the thickness of the prepreg to be divided increases, and the thickness of the prepreg is preferably set to 200 μm or less if the layered substrate is supposed to be applied to a structural material. On the other hand, when the thickness is less than 50 μm, it is difficult to handle the prepreg and the number of prepregs to be layered to form a layered substrate is significantly large, and thus the productivity significantly deteriorates. Hence, the thickness is preferably 50 μm or more and 200 μm or less from the viewpoint of productivity. The dimensions other than the thickness of the prepreg, for example, when the flat cross-sectional shape of the prepreg is a rectangular shape, the length or width of the rectangular shape is arbitrarily determined so as to suit the method for manufacturing the layered substrate, but in the present embodiment, the prepreg may be used after being cut so as to have a length and a width of about from 200 to 2000 mm, respectively, when the prepreg is layered into a layered substrate. The length of at least one side of the prepreg, specifically the length or width of the rectangular shape in the flat cross-sectional shape is preferably 1 m or more. The area of the prepreg, specifically the area of the rectangular shape in the flat cross-sectional shape is preferably 1 m² or more.

As the reinforcing fiber that can be used in the layered substrate of the present embodiment, the kind of the reinforcing fiber is not particularly limited, and an inorganic fiber, an organic fiber, a metal fiber, or a reinforcing fiber having a hybrid configuration obtained by combining these can be used. Examples of the inorganic fiber may include a carbon fiber, a graphite fiber, a silicon carbide fiber, an alumina fiber, a tungsten carbide fiber, a boron fiber, and a glass fiber. Examples of the organic fiber may include an aramid fiber, a high density polyethylene fiber, other common nylon fibers, and a polyester. Examples of the metal fiber may include a fiber of stainless steel, iron or the like, and it may also be a carbon fiber coated with a metal. Among these, a carbon fiber is preferable in consideration of the mechanical properties such as the strength of the final molded product. The average fiber diameter of the reinforcing fiber is preferably from 1 to 50 μm and more preferably from 5 to 20 μm.

In the prepreg of the present embodiment, the reinforcing fiber described above is oriented in one direction. To be oriented in one direction (or arranged in one direction) is that the directions of the length of the fibers are substantially parallel. To be substantially parallel is specifically that the directions of from 90% to 100% of the lengths of the fibers contained in the prepreg are within a range of from −5° to +5° and preferably the directions of from 95% to 100% of the lengths of the fibers contained in the prepreg are within a range of from −2° to +2°. In the present embodiment, it is preferable that the fibers are oriented in one direction (this state is also referred to that the fibers are pulled and aligned in one direction) as the directions of the fibers are substantially uniformly aligned by applying a tension to the fibers bundled together particularly in the manufacture of the prepreg.

The average single fiber fineness of the reinforcing fiber is usually 0.1 dtex or more and 5.0 dtex or less. It is difficult to open the reinforcing fiber and thus it is impossible to manufacture the prepregs when the average single fiber fineness is too low, and a decrease in mechanical properties is caused when the fineness is too high. Here, the average single fiber fineness is a value defined as the mass per 10,000 m of fiber and is determined by dividing the mass of the fiber bundle having a predetermined length by the number of fibers and converting the value thus obtained into the length of 10,000 m. As the reinforcing fiber used in the present embodiment, a carbon fiber having an average single fiber fineness of 0.5 dtex or more and 2.4 dtex or less is particularly preferable.

A thermoplastic resin is used in the layered substrate of the present embodiment. In other words, in the case of a fiber reinforced plastic using a discontinuous reinforcing fiber, the strength, particularly impact resistance (anti-shock property) is improved as a thermoplastic resin having a higher toughness value than a thermosetting resin is generally used in order to fracture the thermoplastic resin so as to couple the ends of the reinforcing fibers with one another. Moreover, the shape is determined by cooling and solidifying the thermoplastic resin without involving a chemical reaction, and thus the thermoplastic resin can be molded in a short time and exhibits excellent productivity. As such a thermoplastic resin, it is possible to use a polyamide (nylon 6, nylon 66, or the like), a polyolefin (polyethylene, polypropylene, or the like), a modified polyolefin, a polyester (polyethylene terephthalate, polybutylene terephthalate, or the like), an acryl (polymethyl methacrylate, or the like), a polycarbonate, a polyamide-imide, polyphenylene oxide, a polysulfone, a polyether sulfone, polyether ether ketone, a polyether imide, polystyrene, ABS, polyphenylene sulfide, a liquid crystalline polyester, or a copolymer of acrylonitrile and styrene. In addition, any mixture of these may also be used.

Furthermore, it may be copolymerized one such as copolymer nylon of nylon 6 and nylon 66. As the thermoplastic resin used in the present embodiment, particularly, a polyamide, a polyolefin, a modified polyolefin, an acryl, or a polycarbonate is preferable from the viewpoint of an affinity for the reinforcing fiber, high mechanical properties, and high fluidity. In addition, it is also possible to previously add a flame retardant, a weatherability improver, another antioxidant, a heat stabilizer, an ultraviolet absorber, a plasticizer, a lubricant, a colorant, a compatibilizer, or a conductive filler depending on the required properties of the molded article intended to obtain. In the present embodiment, a thermoplastic matrix resin containing this thermoplastic resin as the constituting material is used.

(Layered Substrate)

The layered substrate according to the present embodiment is a layered substrate fabricated by layering plural sheets of prepregs described above. Specifically, it is a layered substrate fabricated by layering two or more sheets of prepregs, preferably a layered substrate fabricated by layering four or more sheets of prepregs and particularly preferably a layered substrate fabricated by layering eight or more sheets of prepregs from the viewpoint of high fluidity. Incidentally, it is usually a layered substrate fabricated by layering 192 or fewer sheets of prepregs and preferably a layered substrate fabricated by layering 96 or fewer sheets of prepregs from the viewpoint of production cost.

In the layered substrate of the present embodiment, it is preferable that plural sheets of prepregs are layered such that the directions of the reinforcing fibers are quasi-isotropic from the viewpoint of decreasing the anisotropy of the flow at the time of pressing. Here, the term "quasi-isotropic" means the fibers of the respective layers are layered at equal angles denoted by 360°/n (n is an integer of 3 or more as a guideline). As the prepregs are layered so as to be quasi-isotropic, a layered substrate exhibiting excellent physical properties such as rigidity or elasticity in more directions is obtained. In the present embodiment, a layered substrate in which the respective fibers are layered at equal angles of, for example n=8, namely 45° is used.

In the layered substrate of the present embodiment, it is preferable that the prepregs having the direction of the reinforcing fibers contained in the prepregs of 0° and the prepregs having the direction of the reinforcing fibers contained in the prepregs of 90° are alternately layered from the viewpoint of decreasing the anisotropy of the strength of the layered substrate. Here, the direction of the reinforcing fiber refers to the direction with respect to 0° when the direction of the reinforcing fiber contained in arbitrary one among the prepregs is denoted as 0°.

In the layered substrate of the present embodiment, it is preferable that a layer composed of a thermoplastic resin is further layered between the plurality of prepregs constituting the layered substrate from the viewpoint of further improving the fluidity at the time of pressing. As such a layer composed of a thermoplastic resin, it is possible to preferably use the same resin composition as the resin composition contained in the prepreg or a polyamide (nylon 6, nylon 66, or the like), a polyolefin (polyethylene, polypropylene, or the like), a modified polyolefin, a polyester (polyethylene terephthalate, polybutylene terephthalate, or the like), an acryl (polymethyl methacrylate, or the like), a polycarbonate, a polyamide-imide, polyphenylene oxide, a polysulfone, a polyether sulfone, polyether ether ketone, a polyether imide, polystyrene, ABS, polyphenylene sulfide, a liquid crystalline polyester, or a copolymer of acrylonitrile and styrene. The layer composed of a thermoplastic resin is particularly preferably a polyamide, a polyolefin, a modified polyolefin, an acryl, or a polycarbonate from the viewpoint of an affinity for the prepreg, high mechanical properties, and high fluidity.

In the layered substrate of the present embodiment, it is preferable that the fiber volume content Vf is 55% or less since sufficient fluidity can be obtained. The fluidity is improved as the value of Vf is smaller, but the mechanical properties required for a structural material cannot be obtained when the value of Vf is less than 20%. In view of the relation between these fluidity and mechanical properties, Vf is preferably 20% or more and 55% or less. The Vf value can be determined on the basis of the method described above.

The thickness of the layered substrate of the present embodiment is usually from 10 to 500 μm and preferably from 50 to 200 μm from the viewpoint of slit processability although it depends on the specifications required for the layered substrate. Here, the thickness of the layered substrate adopts the value measured at arbitrary plural sites of the layered substrate using a micrometer.

In the layered substrate according to the present embodiment, it is preferable that the prepregs constituting the layered substrate are bonded to one another from the viewpoint of handling of the layered substrate. In a case in which a layer other than the prepregs such as a layer composed of a thermoplastic resin is further layered between the plurality of prepregs constituting the layered substrate, it is preferable that the layer and the prepregs are bonded to each other. The bonding of the prepregs may be conducted by an arbitrary method but may be conducted via an adhesive or by heat welding or vibration welding as to be described later.

In the layered substrate of the present embodiment, it is preferable that 50% or more and more preferably 60% or more of the entire outer peripheral cross section of the layered substrate is covered with a sheet-shaped material which retains the shape at a temperature of the melting point +10° C. of the matrix resin constituting the prepreg from the viewpoint of handling. Here, the outer peripheral cross section specifically refers to the surface of the layered substrate other than the front surface and back surface thereof, namely, the surface of the outer peripheral part of the layered substrate not including the front surface and back surface thereof. It is more preferable that the sheet is covered along the outer periphery of the layered substrate so as to cover the outer peripheral portion of the lowermost layer substrate, the outer peripheral cross section of the layered substrate, and the outer peripheral portion of the uppermost layer substrate. The outer peripheral portion of the lowermost layer substrate refers to the range in the vicinity of the part surrounding the substrate constituting the ground layer of the layered substrate, the outer peripheral cross section of the layered substrate refers to the surface of the outer peripheral part of the layered substrate not including the front surface and back surface thereof, and the outer peripheral portion of the uppermost layer substrate refers to the range in the vicinity of the part surrounding the substrate constituting the top layer of the layered substrate.

The expression "to retain the shape at a temperature of the melting point +10° C. of the matrix resin constituting the prepreg" means that the ratio of the Young's moduli at the temperature (melting point +10° C. of the matrix resin) and 23° C. of the sheet-shaped material is 0.8 or more. The sheet shape refers to the shape in which the area is especially larger with respect to the thickness (as a guideline, the width and the length are at least $1/100$ or more of the area). Examples of the sheet-shaped material may include paper, cloth, a plastic film, or a metal foil. It is preferable to use a pressure sensitive adhesive tape as the sheet-shaped material from the viewpoint of ease of use.

(Method for Manufacturing Layered Substrate)

Hereinafter, an embodiment of the method for manufacturing the prepreg that can be used in the layered substrate of the present embodiment will be described, but the present embodiment is not particularly limited by this.

The prepreg that can be used in the layered substrate of the present embodiment can be obtained, for example, by preparing two sheets of film-shaped thermoplastic resin, sandwiching a reinforcing fiber sheet obtained by lining reinforcing fibers up in a sheet-shape between the two sheets, and heating and pressurizing the resultant.

As the reinforcing fiber sheet, those prepared by the following method are used. For example, the reinforcing fiber sheet is prepared by a technique in which the fibers are arranged and a tension is applied thereto when pulling and aligning the carbon fibers in one direction.

When this reinforcing fiber sheet is sandwiched between the films of a thermoplastic resin and formed into a prepregs, more specifically, two sheets of films are fed from the two rolls to feed two sheets of films composed of a thermoplastic resin and also the reinforcing fiber sheet supplied from a roll for the reinforcing fiber sheet is sandwiched between the two films, and the resultant is then heated and pressurized. As the means for applying heat and pressure, known ones can be used, and the means may be those requiring a multi-stage step which utilizes two or more heated rolls, utilizes a pre-heating device and plural pairs of heated rolls, or the like. Here, the thermoplastic resin constituting the film is not required to be one kind, but a film composed of a thermoplastic resin of another kind may be further layered using the device as described above.

The heating temperature is usually preferably from 100 to 400° C. although it depends on the kind of the thermoplastic resin. Meanwhile, the pressure at the time of pressurizing is usually preferably from 0.1 to 10 MPa. It is preferable that the heating temperature and the pressure are in these ranges since it is possible to impregnate the thermoplastic resin into between the reinforcing fibers contained in the prepreg. In addition, as the prepreg that can be used in the layered substrate of the present embodiment, it is possible to use a commercially available prepreg.

The slit of the prepreg that can be used in the layered substrate of the present embodiment can be obtained by carving the slit utilizing a laser marker, a cutting plotter, a cutting die, or the like. In other words, a slit is obtained by drilling a shape with respect to the thermoplastic resin of the prepreg with heat using a laser marker, a slit is obtained by cutting out the surface of the prepreg using a cutting plotter, a slit is obtained by cutting out a certain shape from the prepreg using a cutting die, or the like. However, it is preferable that the slit is carved using a laser marker since there is an effect that a complicated slit such as a curve or a zigzag can be processed at a high speed, in addition, it is preferable that the slit is carved using a cutting plotter since there is an effect that a prepreg layer having a large size of 2 m or more can be processed. Furthermore, it is preferable that the slit is carved using a cutting die since there is an effect that that the slit can be processed at a high speed.

In the next step, the layered substrate is fabricated by layering the prepregs obtained as described above such that the directions of the reinforcing fibers are quasi-isotropic or so as to be alternate lamination. At this time, it is also possible to fabricate a layered substrate by spot welding using an ultrasonic welding machine (product name: 2000LPt manufactured by Emerson Japan, Ltd.) from the viewpoint of ease of handling. In addition, it is preferable that the layered substrate of the present embodiment is fabricated by layering the prepregs so as to be from 8 to 96 layers.

In the next step, the layered substrate obtained as described above is integrated by heating and pressurizing (hot stamping) to mold the layered substrate. This step can be performed using various devices that are usually used for heating and pressurization, for example, a heating press machine, and as the mold to be used at that time, those which have a desired shape can be used. For the nature of the material for the mold, it is possible to employ those which are usually used in hot stamping molding and it is possible to use a so-called mold made of a metal. Specifically, the present step can be performed, for example, by disposing the layered substrate in a mold and applying heat and a pressure thereto.

In the heating, it is preferable to heat the layered substrate at from 100 to 400° C. and even more preferably at from 150 to 350° C. although it depends on the kind of the thermoplastic resin contained therein. In addition, preliminary heating may be conducted prior to the heating. For the preliminary heating, it is preferable to heat the layered substrate generally at from 150 to 400° C. and preferably at from 200 to 380° C.

The pressure applied to the layered substrate in the pressurization is preferably from 0.1 to 10 MPa and more preferably from 0.2 to 2 MPa. For this pressure, a value obtained by dividing the press force by the area of the layered substrate is adopted.

The time for heating and pressurization is preferably from 0.1 to 30 minutes and more preferably from 0.5 to 10 minutes. In addition, the cooling time provided after heating and pressurization is preferably from 0.5 to 30 minutes. The thickness of the layered substrate which has undergone hot stamping molding and thus been integrated according to the present embodiment is preferably from 0.5 to 10 mm.

Incidentally, the heating and pressurization may be conducted under a condition that a lubricant is present between the mold and the layered substrate. This is because the fluidity of the reinforcing fiber contained in the prepreg constituting the layered substrate increases at the time of heating and pressurizing by the action of the lubricant and thus it is possible to decrease voids between the reinforcing fibers and between the reinforcing fiber and the thermoplastic resin in the layered substrate to be obtained as well as the impregnation of the thermoplastic resin into between the reinforcing fibers increases.

As the lubricant, it is possible to use, for example, a silicone-based lubricant and a fluorine-based lubricant. In addition, a mixture of these may also be used as the lubricant. As the silicone-based lubricant used as the lubricant, heat resistant ones which can be used in a high temperature environment is preferably used. More specifically, a silicone oil such as methyl phenyl silicone oil or dimethyl silicone oil may be mentioned, and it is possible to preferably use those which are commercially available. As the fluorine-based lubricant, heat resistant ones which can be used in a high temperature environment is preferably used. As specific examples of such a lubricant, it is possible to use a fluorine oil such as perfluoropolyether oil or a low grade polymer of ethylene trifluoride chloride (mass average molecular weight of from 500 to 1300).

The lubricant may be supplied onto the surface of one side or both sides of the layered substrate, the surface of one side or both sides of the mold, or the surface of one side or both sides of both the mold and the layered substrate by a proper means such as a lubricant coating apparatus, or the lubricant may be coated on the surface of the mold in advance. Among them, a mode in which the lubricant is supplied to the surface of both sides of the layered substrate is preferable.

The prepreg that can be used in the layered substrate of the present embodiment can also be fabricated into a layered substrate by layering it while spot welding the prepregs constituting the adjacent layers using an ultrasonic welding machine, and this is preferable from the viewpoint of facilitating handling.

As another embodiment of the method for manufacturing a layered substrate of the present embodiment, a method for manufacturing a layered substrate which is a method for manufacturing a layered substrate by layering plural sheets of prepregs and in which plural sheets of the prepregs are layered and 50% or more of the entire outer peripheral cross section of the layered substrate is then covered with a sheet-shaped material which retains the shape at a temperature of the melting point +10° C. of the matrix resin constituting the prepreg. It is possible to easily handle the layered substrate according to this manufacturing method.

The sheet-shaped material which retains the shape at a temperature of the melting point +10° C. of the matrix resin constituting the prepreg is as described above. In addition, the fact that 50% or more of the entire outer peripheral cross section of the layered substrate is covered with a sheet-shaped material which retains the shape at a temperature of the melting point +10° C. of the matrix resin constituting the prepreg is also as described above.

In the method for manufacturing a layered substrate of the present embodiment, the sheet-shaped material is a pressure sensitive adhesive tape from the viewpoint of productivity, and it is more preferable that the method is the method for manufacturing a layered substrate described above in which the pressure sensitive adhesive tape is pasted along the outer periphery of the layered substrate so as to cover the outer peripheral portion of the lowermost layer substrate, the outer peripheral cross section of the layered substrate, and the outer peripheral portion of the uppermost layer substrate.

In the method for manufacturing a layered substrate of the present embodiment, from the viewpoint that the layered substrate to be obtained has small variations in mechanical properties while having excellent mechanical properties such as a flexural strength or a modulus of elasticity in tension applicable to a structural material and further exhibits excellent formability into a complicated shape, in the method for manufacturing a layered substrate, it is preferable that the prepreg has the slit that is described above and penetrates from the front surface to the back surface, each slit is provided so as to intersect with each reinforcing fiber only one time, in a case in which the length of the line connecting the starting point with the end point of the slit is denoted as Ls, the length Ls of the line and the length Lr of the slit satisfy the relation of the following Equation 1, $$Ls \leq Lr \leq Ls \times 1.5 \quad \text{(Equation 1)}$$

and the straight line connecting the starting point with the end point of the slit and the fiber direction of the reinforcing fiber intersect at an angle of 30° or more and 90° or less. Furthermore, it is preferable that the slit of the prepreg has a slit length of from 5 to 100 mm and the sum of the slit length per 1 m$^2$ of the prepreg is 20 m or longer and 200 m or shorter.

Examples of the method to carve the slit into the prepreg may include a method to carve a slit using a laser marker, a method to carve a slit using a cutting plotter, and a method to carve a slit using a punching die. This operation may be conducted with respect to the prepreg sheet before layering the prepreg sheet.

Examples of the method to bond the prepregs constituting the layered substrate to one another may include a method in which the prepregs layered are bonded to one another by heat welding, namely, by applying heat to the prepregs and thus melting a part of the resin and the like contained in the prepregs, a method in which the prepregs layered are bonded to one another by vibration welding, namely, by applying vibration to the prepregs and thus melting a part of the resin and the like contained in the prepregs, a method in which the prepregs layered are bonded to one another by hot pressing, namely, by applying heat and a pressure to the prepregs and thus melting a part of the resin and the like contained in the prepregs, and a method in which the prepregs layered are bonded to one another by hot roll pressing, namely, by applying heat and a pressure to the prepregs and thus melting a part of the resin and the like contained in the prepregs. This operation may be conducted before or after the operation to cover 50% or more of the entire outer peripheral cross section of the layered substrate with a sheet-shaped material which retains the shape at a temperature of the melting point +10° C. of the matrix resin constituting the prepreg.

(Evaluation of Fluidity by Press)

The layered substrate of the present embodiment exhibits favorable fluidity at the time of molding, and thus it can be formed into various complicated shapes. The fluidity can be evaluated by being great in the degree that the thickness of the layered substrate after heating and pressurization is decreased as compared with the thickness of the layered substrate before heating and pressurization, for example, in the case of heating and pressurizing the layered substrate. Specifically, a layered substrate is regarded to be excellent in fluidity as the value obtained by dividing the thickness of the layered substrate before press by the thickness thereof after press is larger, for example, in a case in which the layered substrate that is integrated by heating and pressurization and has a thickness of 2 mm is cut into 78 mm and 2 sheets thereof are overlapped, the resultant is then kept in a heater heated to 230° C. in advance for 10 minutes, then immediately moved to and sandwiched in a small press (product name: MINI TEST PRESS MP-2FH manufactured by TOYO SEIKI SEISAKU-SHO, Ltd.) heated to 145° C., and pressed in the condition of 10 MPa and 60 seconds. The fluidity of the layered substrate of the present embodiment is usually 2.0 or more and preferably 2.5 or more.

(Three-point Bending Test)

In addition, the layered substrate of the present embodiment that is integrated by heating and pressurization has an excellent fracture strength (flexural strength). The flexural strength can be measured on the basis of JIS K7074. The flexural strength of the layered substrate of the present embodiment is usually 250 MPa or more and preferably 300 MPa or more.

(Tensile Test)

In addition, the layered substrate of the present embodiment that is integrated by heating and pressurization has an excellent tensile strength. The tensile strength can be measured on the basis of JIS K7164. The tensile strength of the layered substrate of the present embodiment is usually 150 MPa or more and preferably 200 MPa or more.

EXAMPLES

Hereinafter, embodiments of the invention will be more specifically described with reference to Examples, but the invention is not limited to the invention described in Examples.

(Evaluation Method)

As the evaluation on fluidity by press in the present embodiment, as described above, the value obtained by dividing the thickness of the layered substrate before press by the thickness thereof after press was evaluated in a case in which the layered substrate that was integrated by heating and pressurization and has a thickness of 2 mm is cut into 78 mm² and 2 sheets thereof are overlapped, the resultant was then kept in a heater heated to 230° C. in advance for 10 minutes, then immediately moved to and sandwiched in a small press (product name: MINI TEST PRESS MP-2FH manufactured by TOYO SEIKI SEISAKU-SHO, Ltd.) heated to 145° C., and pressed in the condition of 10 MPa and 60 seconds.

For the three-point bending test, a three-point bending test was conducted on the basis of JIS K7074 described above and by placing a test piece having a width of 25 mm and a length of 100 mm on a support of R2 mm and having a distance between the gauge marks of 80 mm and using an indenter of R5 mm, and at a crosshead speed of 5 mm/min.

For the test of tensile strength, a tensile test was conducted on the basis of JIS K7164 described above, by fixing 25 mm from both ends of a test piece having a width of 25 mm and a length of 250 mm with a chuck, and at a crosshead speed of 2 mm/min.

Example 1

Carbon fibers (product name: PYROFIL (registered trademark) TR-50S15L manufactured by Mitsubishi Rayon Co., Ltd.) were pulled and aligned in a plane shape such that the directions of reinforcing fibers were one direction, thereby obtaining a reinforcing fiber sheet having a basis weight of 72.0 g/m². Both surfaces of the reinforcing fiber sheet were sandwiched between films composed of an acid-modified polypropylene resin (product name: MODIC (registered trademark) P958, basis weight: 36.4 g/m² manufactured by Mitsubishi Chemical Corporation), the resultant was allowed to pass through a calendar roll to impregnate the reinforcing fiber sheet with a thermoplastic resin, thereby obtaining a prepreg having a fiber volume content (Vf) of 33% and a thickness of 0.12 mm.

The prepreg thus obtained was cut into 300 mm², and a straight (Ls=Lr) slit was carved into the prepreg cut at regular intervals using a cutting plotter (product name: L-2500 manufactured by LASERCK) as illustrated in FIG. 1. At that time, the slit processing was conducted at θ=30° so as to have a constant L=25.0 mm and a slit length l=20.0 mm excluding the inside part at 5 mm from the end of the sheet. At this time, it was la=80.0 m.

In addition, the time required for slit processing per one sheet was measured and defined as the slit processing time.

A layered substrate was fabricated by overlapping 16 layers of the prepregs with slit obtained in this manner to be quasi-isotropic ([0/45/90/−45]s2) and spot welding them using an ultrasonic welding machine (product name: 2000LPt manufactured by Emerson Japan, Ltd.).

The layered substrate obtained in this manner was disposed in a seal case having 300 mm² and a depth of 1.5 mm, heated, kept for 7 minutes under the conditions of 220° C. and a hydraulic oil pressure indication of 0 MPa in a high temperature side press using a compression molding machine (product name: SFA-50HH0 manufactured by SHINTO Metal Industries Corporation), subsequently kept therein for 7 minutes under the conditions of the same temperature and a hydraulic oil pressure indication of 2 MPa (press pressure: 0.55 MPa), and the mold was then moved to a cooling press and kept therein at 30° C. and a hydraulic oil pressure indication of 5 MPa (press pressure: 1.38 MPa) for 3 minutes, thereby obtaining a molded article.

The layered substrate thus obtained maintained a favorable appearance and smoothness as the reinforcing fiber was not wavy, the reinforcing fiber uniformly flowed to its end, and there was no warp.

A test piece for flexural strength test having a length of 100 mm and a width of 25 mm was cut out from the layered substrate thus obtained. The three-point bending test was conducted in conformity with the test method prescribed in JIS K7074 using a universal testing machine (product name: MODEL 4465 manufactured by INSTRON) by setting the distance between the gauge marks to 80 mm at a crosshead speed of 5.0 mm/min. The number of the test pieces measured was n=6, and the average value of the values measured was adopted as the flexural strength.

A test piece for tensile test having a length of 250 mm and a width of 25 mm was cut out from the layered substrate thus obtained. The tensile test was conducted in conformity with the test method prescribed in JIS K7164 using a universal testing machine (product name: MODEL 4465 manufactured by INSTRON) at a crosshead speed of 2.0 mm/min. The number of the test pieces measured was n=6, and the average value of the values measured was adopted as the tensile strength.

From the layered substrate thus obtained, 2 pieces of plate-shaped material having the length of 78 mm and the width of 78 mm were cut out. The 2 pieces of plate-shaped material were overlapped, heated at 230° C. for 10 minutes using MINI TEST PRESS (product name: MP-2FH manufactured by TOYO SEIKI SEISAKU-SHO, Ltd.), and then pressed for 60 seconds under the conditions of 145° C. and 10 MPa. The thicknesses of the plate-shaped material before and after press molding were measured, and the initial thickness was divided by the final thickness to evaluate the fluidity.

The evaluation results of Example 1 were favorable in all of the flexural strength, flexural modulus, tensile strength, fluidity, and processing time.

Example 2

The layered substrate and the molded article thereof were fabricated by the same method as in Example 1 except that the straight (Ls=Lr) slit processing was conducted at θ=30° so as to have a constant L=25.0 mm and a slit length l=40.0 mm, and the layered substrate and the molded article thus obtained were subjected to the evaluation. At this time, it was la=80.0 m. The evaluation results were favorable in all of the flexural strength, flexural modulus, tensile strength, fluidity, and processing time.

Example 3

The layered substrate and the molded article thereof were fabricated by the same method as in Example 1 except that the straight (Ls=Lr) slit processing was conducted at θ=30° so as to have a constant L=25.0 mm and a slit length l=60.0 mm, and the layered substrate and the molded article thus obtained were subjected to the evaluation. At this time, it was la=80.0 m. The evaluation results were favorable in all of the flexural strength, flexural modulus, tensile strength, fluidity, and processing time.

Example 4

The layered substrate and the molded article thereof were fabricated by the same method as in Example 1 except that the straight (Ls=Lr) slit processing was conducted at θ=30° so as to have a constant L=37.5 mm and a slit length l=40.0 mm, and the layered substrate and the molded article thus obtained were subjected to the evaluation. At this time, it was la=53.3 m. The evaluation results were favorable in all of the flexural strength, flexural modulus, tensile strength, fluidity, and processing time.

Comparative Example 1

The straight (Ls=Lr) slit processing was conducted at θ=10° so as to have a constant L=25.0 mm and a slit length l=86.4 mm. However, it was not possible to conduct the slit processing since the blade of the cutting plotter slipped.

Comparative Example 2

The layered substrate and the molded article thereof were fabricated by the same method as in Example 1 except that the straight (Ls=Lr) slit processing was conducted at θ=15° so as to have a constant L=25.0 mm and a slit length l=77.3 mm, and the layered substrate and the molded article thus obtained were subjected to the evaluation. At this time, it was la=154.5 m. The evaluation results were favorable in all of the flexural strength, flexural modulus, tensile strength, and processing time, but the fluidity was insufficient.

Comparative Example 3

The layered substrate and the molded article thereof were fabricated by the same method as in Example 1 except that the straight (Ls=Lr) slit processing was conducted at θ=30° so as to have a constant L=3.0 mm and a slit length l=40.0 mm, and the layered substrate and the molded article thus obtained were subjected to the evaluation. At this time, it was la=666.7 m. The evaluation results were favorable in both the flexural modulus and the fluidity, but the flexural strength and tensile strength were insufficient, and the processing time was significantly long.

Comparative Example 4

The layered substrate and the molded article thereof were fabricated by the same method as in Example 1 except that the straight (Ls=Lr) slit processing was conducted at θ=45° so as to have a constant L=3.0 mm and a slit length l=28.3 mm, and the layered substrate and the molded article thus obtained were subjected to the evaluation. At this time, it was la=471.4 m. The evaluation results were favorable in both the flexural modulus and the fluidity, but the flexural strength and tensile strength were insufficient, and the processing time was significantly long.

Example 5

The layered substrate and the molded article thereof were fabricated by the same method as in Example 1 except that the straight (Ls=Lr) slit processing was conducted at θ=30° so as to have a constant L=12.5 mm and a slit length l=40.0 mm, and the layered substrate and the molded article thus obtained were subjected to the evaluation. At this time, it was la=160.0 m. The evaluation results were favorable in all of the flexural strength, flexural modulus, tensile strength, fluidity, and processing time.

Example 6

The layered substrate and the molded article thereof were fabricated by the same method as in Example 1 except that the straight (Ls=Lr) slit processing was conducted at θ=45° so as to have a constant L=12.5 mm and a slit length l=28.3 mm, and the layered substrate and the molded article thus obtained were subjected to the evaluation. At this time, it was la=113.1 m. The evaluation results were favorable in all of the flexural strength, flexural modulus, tensile strength, fluidity, and processing time.

Example 7

The layered substrate and the molded article thereof were fabricated by the same method as in Example 1 except that the straight (Ls=Lr) slit processing was conducted at θ=45° so as to have a constant L=25.0 mm and a slit length l=14.1 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

Example 8

The layered substrate and the molded article thereof were fabricated by the same method as in Example 1 except that the straight (Ls=Lr) slit processing was conducted at θ=45° so as to have a constant L=25.0 mm and a slit length l=28.3 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

Example 9

The layered substrate and the molded article thereof were fabricated by the same method as in Example 1 except that the straight (Ls=Lr) slit processing was conducted at θ=45° so as to have a constant L=25.0 mm and a slit length l=42.4 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

Comparative Example 10

The layered substrate and the molded article thereof were fabricated by the same method as in Example 1 except that the straight (Ls=Lr) slit processing was conducted at θ=45° so as to have a constant L=37.5 mm and a slit length l=28.3 mm, and the layered substrate and the molded article thus obtained were subjected to the evaluation. At this time, it was la=37.7 m. The evaluation results were favorable in all of the flexural strength, flexural modulus, tensile strength, fluidity, and processing time.

Comparative Example 11

The layered substrate and the molded article thereof were fabricated by the same method as in Example 1 except that the straight (Ls=Lr) slit processing was conducted at θ=60° so as to have a constant L=25.0 mm and a slit length l=23.1 mm, and the layered substrate and the molded article thus obtained were subjected to the evaluation. At this time, it was la=46.2 m. The evaluation results were favorable in all of the flexural strength, flexural modulus, tensile strength, fluidity, and processing time.

Comparative Example 12

The layered substrate and the molded article thereof were fabricated by the same method as in Example 1 except that the straight (Ls=Lr) slit processing was conducted at θ=75° so as to have a constant L=25.0 mm and a slit length l=20.7 mm, and the layered substrate and the molded article thus obtained were subjected to the evaluation. At this time, it was la=41.4 m. The evaluation results were favorable in all of the flexural strength, flexural modulus, tensile strength, fluidity, and processing time.

Comparative Example 13

The layered substrate and the molded article thereof were fabricated by the same method as in Example 1 except that the straight (Ls=Lr) slit processing was conducted at θ=90° so as to have a constant L=25.0 mm and a slit length l=20.0 mm, and the layered substrate and the molded article thus obtained were subjected to the evaluation, At this time, it was la=40.0 m. The evaluation results were favorable in all of the flexural strength, flexural modulus, tensile strength, fluidity, and processing time.

Example 14

The layered substrate and the molded article thereof were fabricated by the same method as in Example 1 except that the straight (Ls=Lr) slit processing was conducted at θ=45° so as to have a constant L=50.0 mm and a slit length l=28.3 mm, and the layered substrate and the molded article thus obtained were subjected to the evaluation. At this time, it was la=28.3 m. The evaluation results were favorable in all of the flexural strength, flexural modulus, tensile strength, fluidity, and processing time.

Comparative Example 5

The layered substrate and the molded article thereof were fabricated by the same method as in Example 1 except that the straight (Ls=Lr) slit processing was conducted at θ=45° so as to have a constant L=100.0 mm and a slit length l=28.3 mm, and the layered substrate and the molded article thus obtained were subjected to the evaluation. At this time, it was la=14.1 m. The evaluation results were favorable in all of the flexural strength, flexural modulus, tensile strength, and processing time, but the fluidity was insufficient.

Example 15

The layered substrate and the molded article thereof were fabricated by the same method as in Example 1 except that processing of a sine curve-shaped slit of y=sin(0.5X) mm with respect to the X-axis (X-axis is a straight line connecting the starting point with the end point of the slit) at an angle of θ=30° with respect to the reinforcing fiber was conducted (FIG. 2) so as to have a constant L=25.0 mm and a slit length l=42.4 mm, and the layered substrate and the molded article thus obtained were subjected to the evaluation. At this time, it was 1.1 Ls=Lr and la=84.9 m. The evaluation results were favorable in all of the flexural strength, flexural modulus, tensile strength, fluidity, and processing time.

Example 16

The layered substrate and the molded article thereof were fabricated by the same method as in Example 1 except that processing of a sine curve-shaped slit of y=2.0 sin(0.5X) mm with respect to the X-axis (X-axis is a straight line connecting the starting point with the end point of the slit) at an angle of θ=45° with respect to the reinforcing fiber was conducted (FIG. 2) so as to have a constant L=25.0 mm and a slit length l=34.6 mm, and the layered substrate and the molded article thus obtained were subjected to the evaluation. At this time, it was 1.2 Ls=Lr and la=69.2 m. The evaluation results were favorable in all of the flexural strength, flexural modulus, tensile strength, fluidity, and processing time.

Example 17

The layered substrate and the molded article thereof were fabricated by the same method as in Example 1 except that a laser marker (product name: LP-S500 manufactured by Panasonic Industrial Devices SUNX Co., Ltd.) was used for slit processing and the straight (Ls=Lr) slit processing was conducted at θ=45° so as to have a constant L=25.0 mm and a slit length l=28.3 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

Example 18

The layered substrate and the molded article thereof were fabricated by the same method as in Example 1 except that a cutting die specially fabricated and a compression molding machine (product name: SFA-50HH0 manufactured by SHINTO Metal Industries Corporation) were used for slit processing and the straight (Ls=Lr) slit processing was conducted at θ=45° so as to have a constant L=25.0 mm and a slit length l=28.3 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

Example 19

Carbon fibers (product name: PYROFIL (registered trademark) TR-50S15L manufactured by Mitsubishi Rayon Co., Ltd.) were pulled and aligned in one direction in a plane shape to obtain a reinforcing fiber sheet having a basis weight of 78.0 g/m$^2$, and both surfaces of the reinforcing fiber sheet were sandwiched between films that were composed of an acid-modified polypropylene resin (product name: MODIC (registered trademark) P958) manufactured by Mitsubishi Chemical Corporation) and had a basis weight of 36.4 g/m$^2$, the resultant was allowed to pass through a calendar roll to impregnate the reinforcing fiber sheet with a thermoplastic resin, thereby obtaining a prepreg having a fiber volume content (Vf) of 35% and a thickness of 0.12 mm. The layered substrate and the molded article thereof were fabricated by the same method as in Example 1 except that the straight (Ls=Lr) slit processing was conducted at θ=45° such that this prepreg had a constant L=25.0 mm and a slit length l=28.3 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

Comparative Example 6

Carbon fibers (product name: PYROFIL (registered trademark) TR-50S15L manufactured by Mitsubishi Rayon Co., Ltd.) were pulled and aligned in one direction in a plane shape to obtain a reinforcing fiber sheet having a basis weight of 93.0 g/m$^2$, and one surface of the reinforcing fiber sheet and a film that was composed of an acid-modified polypropylene resin (product name: MODIC (registered trademark) P958) manufactured by Mitsubishi Chemical Corporation) and had a basis weight of 36.4 g/m² were combined, the resultant was allowed to pass through a calendar roll to impregnate the reinforcing fiber sheet with a thermoplastic resin, thereby obtaining a prepreg having a fiber volume content (Vf) of 56% and a thickness of 0.09 mm. The layered substrate and the molded article thereof were fabricated by the same method as in Example 1 except that the straight (Ls=Lr) slit processing was conducted at θ=45° such that this prepreg had a constant L=25.0 mm and a slit length l=28.3 mm and 24 layers of the prepregs were layered to be quasi-isotropic ([0/45/901-45]s3), and the layered substrate and the molded article thus obtained were subjected to the evaluation. At this time, it was la=56.6 m. The evaluation results were favorable in all of the flexural strength, flexural modulus, tensile strength, and processing time, but the fluidity was insufficient.

Comparative Example 7

The layered substrate and the molded article thereof were fabricated by the same method as in Example 1 except that the straight (Ls=Lr) slit processing was conducted at θ=45° so as to have a constant L=6.0 mm and a slit length l=28.3 mm, and the layered substrate and the molded article thus obtained were subjected to the evaluation. At this time, it was la=235.7 m. The evaluation results were favorable in both the fluidity and the processing time, but the flexural strength and tensile strength were insufficient.

Example 20

Carbon fibers (product name: PYROFIL (registered trademark) TR-50S15L manufactured by Mitsubishi Rayon Co., Ltd.) were pulled and aligned in one direction in a plane shape to obtain a reinforcing fiber sheet having a basis weight of 72.0 g/m², and both surfaces of the reinforcing fiber sheet were sandwiched between films that were composed of a polyamide resin (product name: 1013B manufactured by UBE INDUSTRIES, LTD.) and had a basis weight of 45.6 g/m², the resultant was allowed to pass through a calendar roll to impregnate the reinforcing fiber sheet with a thermoplastic resin, thereby obtaining a prepreg having a fiber volume content (Vf) of 33% and a thickness of 0.12 mm. The layered substrate and the molded article thereof were fabricated by the same method as in Example 1 except that the straight (Ls=Lr) slit processing was conducted at θ=45° such that this prepreg had a constant L=25.0 mm and a slit length l=28.3 mm and the temperature of the high temperature side press was set to 260° C., and the layered substrate and the molded article thus obtained were subjected to the evaluation by the same methods as in Example 1 except the evaluation on fluidity to be described below. At this time, it was la=56.6 m. In addition, for the evaluation on fluidity, the plate-shaped material described in Example 1 was heated at 270° C. for 10 minutes using MINI TEST PRESS (product name: MP-2FH manufactured by TOYO SEIKI SEISAKU-SHO, Ltd.) and pressed for 60 seconds under the conditions of 180° C. and 10 MPa. The thicknesses of the plate-shaped material before and after press molding were measured, and the initial thickness was divided by the final thickness to evaluate the fluidity. The evaluation results were favorable in all of the flexural strength, flexural modulus, tensile strength, fluidity, and processing time.

Example 21

A copolymer containing polyacrylonitrile as the main component and 2-hydroxyethyl methacrylate at 2% by mole was dissolved in dimethyl acetamide to prepare a spinning dope, and a carbon fiber precursor having an average single fiber fineness of 2.5 dtex and the number of the total single fibers of 24,000 was obtained from the spinning dope using a wet spinning method. The carbon fiber precursor thus obtained was further subjected to the air oxidation for 60 minutes in a hot air circulating type flameproof furnace at from 250 to 290° C., thereby conducting the flameproof treatment. Subsequently, the resultant was subjected to the carbonization treatment at 660° for 90 seconds and at 1350° C. for 90 seconds in a high temperature heat treatment furnace under a nitrogen atmosphere, thereby obtaining a carbon fiber. The surface of the carbon fiber thus obtained was subjected to the oxidation treatment in an electrolytic solution, and the resultant was subjected to the sizing treatment so as to have an amount of an epoxy resin as a sizing agent deposited of 0.4% by mass, thereby obtaining a PAN-based carbon fiber (average single fiber fineness: 1.4 dtex, roundness: 0.82, number of filaments: 24,000, strand strength: 4275 MPa, strand elastic modulus: 230 GPa, kind of sizing agent: epoxy resin, amount of sizing agent deposited: 0.4% by mass).

The PAN-based carbon fibers were pulled and aligned in a plane shape such that the directions of reinforcing fibers were one direction, thereby obtaining a reinforcing fiber sheet having a basis weight of 72.0 g/m². Both surfaces of the reinforcing fiber sheet were sandwiched between films composed of an acid-modified polypropylene resin (product name: MODIC (registered trademark) P958, basis weight: 36.4 g/m² manufactured by Mitsubishi Chemical Corporation), the resultant was allowed to pass through a calendar roll to impregnate the reinforcing fiber sheet with a thermoplastic resin, thereby obtaining a prepreg having a fiber volume content (Vf) of 33% and a thickness of 0.12 mm. The layered substrate and the molded article thereof were fabricated by the same method as in Example 1 except that the straight (Ls=Lr) slit processing was conducted at θ=45° so as to have a constant L=25.0 mm and a slit length l=28.3 mm, and the layered substrate and the molded article thus obtained were subjected to the evaluation. At this time, it was la=56.6 m. The evaluation results were favorable in all of the flexural strength, flexural modulus, tensile strength, fluidity, and processing time.

TABLE 1

| | Slit angle θ[°] | Slit shape | Sum of slit length per 1 m² la [m] | Length of reinforcing fiber cut L [m] | Slit length l [m] | Flexural strength [MPa] | Flexural modulus [GPa] | Tensile strength [GPa] | Fluidity | Processing time [sec] |
|---|---|---|---|---|---|---|---|---|---|---|
| Example 1 | 30 | Straight (Ls = Lr) | 80.0 | 25 | 20 | 325 | 28.1 | 244 | 2.6 | 180 |
| Example 2 | 30 | Straight (Ls = Lr) | 80.0 | 25 | 40 | 327 | 28.6 | 245 | 2.8 | 108 |

TABLE 1-continued

|  | Slit angle θ[°] | Slit shape | Sum of slit length per 1 m² la [m] | Length of reinforcing fiber cut L [m] | Slit length l [m] | Flexural strength [MPa] | Flexural modulus [GPa] | Tensile strength [GPa] | Fluidity | Processing time [sec] |
|---|---|---|---|---|---|---|---|---|---|---|
| Example 3 | 30 | Straight (Ls = Lr) | 80.0 | 25 | 60 | 320 | 28.2 | 292 | 2.7 | 83 |
| Example 4 | 30 | Straight (Ls = Lr) | 53.3 | 37.5 | 40 | 333 | 27.6 | 297 | 2.5 | 90 |
| Comparative Example 1 | 10 | Straight (Ls = Lr) | 230.4 | 25 | 86.4 | — | — | — | — | — |
| Comparative Example 2 | 15 | Straight (Ls = Lr) | 154.5 | 25 | 77.3 | 371 | 30.3 | 353 | 2.4 | 137 |
| Comparative Example 3 | 30 | Straight (Ls = Lr) | 666.7 | 3 | 40 | 138 | 21.7 | 96 | 3.5 | 1333 |
| Comparative Example 4 | 45 | Straight (Ls = Lr) | 471.4 | 3 | 28.3 | 127 | 21.2 | 89 | 3.5 | 943 |
| Example 5 | 30 | Straight (Ls = Lr) | 160.0 | 12.5 | 40 | 275 | 27.1 | 252 | 2.9 | 200 |
| Example 6 | 45 | Straight (Ls = Lr) | 113.1 | 12.5 | 28.3 | 254 | 26.5 | 183 | 2.9 | 166 |
| Example 7 | 45 | Straight (Ls = Lr) | 56.6 | 25 | 14.1 | 295 | 28.0 | 221 | 2.7 | 121 |
| Example 8 | 45 | Straight (Ls = Lr) | 56.6 | 25 | 28.3 | 311 | 27.2 | 191 | 2.8 | 96 |
| Example 9 | 45 | Straight (Ls = Lr) | 56.6 | 25 | 42.4 | 305 | 27.7 | 221 | 2.9 | 91 |
| Comparative Example 10 | 45 | Straight (Ls = Lr) | 37.7 | 37.5 | 28.3 | 324 | 29.4 | 247 | 2.5 | 85 |
| Comparative Example 11 | 60 | Straight (Ls = Lr) | 46.2 | 25 | 23.1 | 279 | 26.1 | 229 | 2.9 | 94 |
| Comparative Example 12 | 75 | Straight (Ls = Lr) | 41.4 | 25 | 20.7 | 298 | 26.1 | 156 | 2.8 | 92 |
| Comparative Example 13 | 90 | Straight (Ls = Lr) | 40.0 | 25 | 20 | 297 | 27.5 | 173 | 2.8 | 91 |
| Example 14 | 45 | Straight (Ls = Lr) | 28.3 | 50 | 28.3 | 353 | 28.7 | 207 | 2.5 | 79 |
| Comparative Example 5 | 45 | Straight (Ls = Lr) | 14.1 | 100 | 28.3 | 401 | 33.0 | 248 | 1.7 | 76 |

TABLE 2

|  | Slit angle θ [°] | Slit shape | Sum of slit length per 1 m² la [m] | Length of reinforcing fiber cut L [m] | Slit length l [m] | Flexural strength [MPa] | Flexural modulus [GPa] | Tensile strength [GPa] | Fluidity | Processing time [sec] |
|---|---|---|---|---|---|---|---|---|---|---|
| Example 15 | 30 | Curved(1.1 Ls = Lr) | 84.9 | 25 | 42.4 | 367 | 35.6 | 257 | 2.8 | 164 |
| Example 16 | 45 | Curved(1.2 Ls = Lr) | 69.2 | 25 | 34.6 | 353 | 29.6 | 247 | 2.8 | 155 |
| Example 17 | 45 | Straight (Ls = Lr) | 56.6 | 25 | 28.3 | 321 | 29.8 | 225 | 3.0 | 18 |
| Example 18 | 45 | Straight (Ls = Lr) | 56.6 | 25 | 28.3 | 308 | 28.0 | 216 | 2.9 | 10 |
| Example 19 | 45 | Straight (Ls = Lr) | 56.6 | 25 | 28.3 | 310 | 31.8 | 217 | 2.7 | 91 |
| Comparative Example 6 | 45 | Straight (Ls = Lr) | 56.6 | 25 | 28.3 | 361 | 40.9 | 253 | 1.9 | 91 |
| Comparative Example 7 | 45 | Straight (Ls = Lr) | 235.7 | 6 | 28.3 | 205 | 24.2 | 125 | 3.1 | 332 |
| Example 20 | 45 | Straight (Ls = Lr) | 56.6 | 25 | 28.3 | 445 | 30.0 | 312 | 2.9 | 91 |
| Example 21 | 45 | Straight (Ls = Lr) | 56.6 | 25 | 28.3 | 336 | 30.5 | 235 | 3.2 | 91 |

Example 22

The prepreg obtained by the same method as in Example 1 was cut into 935×1235 mm, and a slit was carved into the prepreg cut at regular intervals using a sample cutting machine (product name: L-2500 manufactured by LASERCK) as illustrated in FIG. 1. At that time, the slit processing was conducted at an angle θ=45° at which the slit to cut the fiber and the reinforcing fiber intersect so as to have a constant reinforcing fiber length L=25.4 mm and an average slit length l=42.4 mm excluding the inside part at 17.5 mm from the end of the sheet. At this time, the sum of the slit length per 1 m² was la=56.6 m.

A layered substrate was fabricated by overlapping 16 layers of the prepregs with slit obtained in this manner to be quasi-isotropic ([0/45/90/-45]s2) and spot welding them using an ultrasonic welding machine (product name: 2000LPt manufactured by Emerson Japan, Ltd.).

A layered substrate was fabricated in which the layered substrate obtained in this manner was fixed by enclosing and pasting an industrial adhesive tape (product name: T4082S, width: 25 mm, manufactured by Sony Chemicals Corporation) around the outermost layer substrates (the first layer of the lowermost layer substrate and the 16$^{th}$ layer of the uppermost layer substrate) including the outer frame cut surface of the prepreg layered body.

The layered substrate thus obtained was favorable in handling property.

The layered substrate obtained in this manner was disposed in a seal case having 940×1240 mm² and a depth of 5 mm, kept for 10 minutes under the conditions of 190° C. and 0.3 MPa in a hot press, subsequently the mold was moved to a cooling press and kept therein for 1 minute under the conditions of 80° C. and 1.1 MPa, thereby obtaining a molded article having a thickness of about 2 mm.

The molded article thus obtained maintained a favorable appearance and smoothness as the reinforcing fiber was not wavy, the reinforcing fiber uniformly flowed to its end, there was no warp, and there was no burr as well. A test piece for flexural strength test having a length of 100 mm and a width of 25 mm was cut out from the layered substrate thus obtained. The three-point bending test was conducted in conformity with the test method prescribed in JIS K7074 using a universal testing machine (product name: MODEL 4465 manufactured by INSTRON) by setting the distance between the gauge marks to 80 mm at a crosshead speed of 5.0 mm/min. The number of the test pieces measured was n=6, and the average value of the values measured was adopted as the flexural strength.

The mass of the molded body after press molding was measured before and after deburring, and the mass of burr was evaluated by being divided by the mass of the molded body before deburring. The judgment of evaluation was carried out based on the following criteria.

"O": Less than 2% by mass of burr.
"X": 2% by mass or more of burr.

TABLE 3

| | Slit angle θ [°] | Slit shape | Sum of slit length per 1 m² la [m] | Length of reinforcing fiber cut L [m] | Slit length l [m] | Flexural strength [MPa] | Flexural modulus [GPa] | Handling | Waviness of reinforcing fiber | Burr |
|---|---|---|---|---|---|---|---|---|---|---|
| Example 22 | 45 | Straight (Ls = Lr) | 56.6 | 25 | 42.4 | 305 | 27.7 | O | O | O |
| Example 23 | 45 | Straight (Ls = Lr) | 56.6 | 25 | 42.4 | 304 | 27.6 | O | O | O |
| Comparative Example 8 | 45 | Straight (Ls = Lr) | 56.6 | 25 | 42.4 | 244 | 22.8 | X | X | X |

The evaluation results were favorable in both the flexural strength and the flexural modulus.

Example 23

In the same manner as in Example 1, the prepreg obtained was cut into 935×1235 mm, and the slit processing of the prepreg cut was conducted using a punching die (manufactured by DAITEX Inc.) so as to have a reinforcing fiber length L=25.4 mm, an average slit length l=42.4 mm excluding the inside part at 17.5 mm from the end of the sheet, an angle θ=45° at which the slit to cut the fiber and the reinforcing fiber intersect, and the sum of the slit length per 1 m² la=56.6 m. The evaluation results were favorable in handling property, the molded plate thus obtained maintained a favorable appearance and smoothness as the reinforcing fiber was not wavy, the reinforcing fiber uniformly flowed to its end, there was no warp, and there was no burr as well. The molded plate thus obtained was favorable in both the flexural strength and the flexural modulus.

Comparative Example 8

In the same manner as in Example 1, a layered substrate that was not fixed by enclosing and pasting a pressure sensitive adhesive tape around the prepreg layered body was fabricated. The evaluation results was unfavorable in handling property, and in the molded plate thus obtained, the reinforcing fiber was wavy, the reinforcing fiber ununiformly flowed, there was a warp, and there was a burr as well. The molded plate thus obtained was unfavorable in flexural modulus.

(Handling Property)

The handling property at the time of handling the layered substrate was evaluated by the sense of the operator. The judgment of evaluation was carried out based on the following criteria.

"O": It is easy to handle.
"X": It is difficult to handle. (Space is formed between layered layers)

(Waviness of Reinforcing Fiber)

The molded body was evaluated by visual observation of the operator. The judgment of evaluation was carried out based on the following criteria.

"O": It is difficult to confirm waviness of reinforcing fiber.
"X": Obvious waviness of reinforcing fiber is confirmed.
(Burr)

INDUSTRIAL APPLICABILITY

According to the invention, it is possible to obtain a layered substrate that exhibits excellent formability into a complicated shape, is able to be molded in a short time, has excellent mechanical properties such as a flexural strength or a flexural modulus applicable to a structural material, and the variations in those mechanical properties are small, and a method for manufacturing the same.

EXPLANATIONS OF LETTERS OR NUMERALS

1 Slit
2 Reinforcing fiber
3 Angle at which slit and reinforcing fiber intersect
4 Slit length
5 Length of reinforcing fiber cut
6 Center line

The invention claimed is:

1. A layered substrate comprising a prepeg, wherein the layered substrate is fabricated by layering plural sheets of sheet-shaped prepregs comprising a reinforcing fiber oriented in one direction and a thermoplastic matrix resin, wherein
   the prepreg has a slit penetrating from a front surface to a back surface,
   each slit is provided so as to intersect with each reinforcing fiber only one time,
   in a case in which a length of a line connecting a starting point with an end point of the slit is denoted as Ls, the length Ls of the line and a length Lr of the slit satisfy the relation of the following Equation 1, $$Ls \leq Lr \leq Ls \times 1.5 \quad \text{(Equation 1)}$$

the line and a fiber direction of the reinforcing fiber intersect at an angle of 30° or more and 90° or less, and
   a sum of the length Lr of the slits per 1 m² of the prepreg is 53.3 m or longer and 200 m or shorter.

2. The layered substrate according to claim 1, wherein a length of the reinforcing fiber cut by the slit is 5 mm or longer and 100 mm or shorter.

3. The layered substrate according to claim 1, wherein the reinforcing fiber is a carbon fiber having an average single fiber fineness of 0.5 dtex or more and 2.4 dtex or less.

4. The layered substrate according to claim 1, wherein the layered substrate further comprises a layer comprising a thermoplastic resin.

5. The layered substrate according to claim 1, wherein a plurality of prepregs constituting the layered substrate are layered such that directions of the reinforcing fiber contained in the prepregs are quasi-isotropic.

6. The layered substrate according to claim 1, wherein a plurality of prepregs constituting the layered substrate are constituted by alternately layering the prepregs having a direction of the reinforcing fiber contained in respective prepregs of 0° and the prepregs having a direction of the reinforcing fiber contained in respective prepregs of 90° when a direction of the reinforcing fiber contained in an arbitrary one among the prepregs is denoted as 0°.

7. The layered substrate according to claim 1, wherein a line connecting a starting point with an end point of a slit and a reinforcing fiber intersect at an angle of 30° or more and 60° or less.

8. The layered substrate according to claim 1, wherein a volume content of the reinforcing fiber contained in the prepreg constituting the layered substrate is 20% by volume or more and 55% by volume or less with respect to a total volume of the prepreg.

9. The layered substrate according to claim 1, wherein in any 5 cm ×5 cm part of the prepreg a sum of the length Lr of the slits per 25 cm² is 0.5 m or longer and 5 m or shorter.

10. The layered substrate according to claim 1, wherein a thickness of the prepreg constituting the layered substrate is 50 μm or more and 200 μm or less.

11. The layered substrate according to claim 1, wherein the prepregs constituting the layered substrate are bonded to one another.

12. The layered substrate according to claim 1, wherein 50% or more of an entire outer peripheral cross section of the layered substrate is covered with a sheet-shaped material which retains its shape at a temperature of a melting point +10° C. of a matrix resin constituting the prepreg.

13. The layered substrate according to claim 12, wherein the sheet-shaped material is a pressure sensitive adhesive tape, and the pressure sensitive adhesive tape is pasted along an outer periphery of the layered substrate so as to cover an outer peripheral portion of a lowermost layer substrate, an outer peripheral cross section of the layered substrate, and an outer peripheral portion of an uppermost layer substrate.

14. A method for manufacturing a layered substrate according to claim 1, the method comprising layering plural sheets of sheet-shaped prepregs, wherein plural sheets of the prepregs are layered and 50% or more of the entire outer peripheral cross section of the layered substrate is then covered with a sheet-shaped material which retains its shape at a temperature of a melting point +10° C. of a matrix resin constituting the prepreg.

15. The method for manufacturing a layered substrate according to claim 14, wherein the sheet-shaped material is a pressure sensitive adhesive tape, and the pressure sensitive adhesive tape is pasted along an outer periphery of the layered substrate so as to cover an outer peripheral portion of a lowermost layer substrate, an outer peripheral cross section of the layered substrate, and an outer peripheral portion of an uppermost layer substrate.

* * * * *